C. A. B. HALVORSON, Jr.
HEADLIGHT REFLECTOR.
APPLICATION FILED JAN. 17, 1921.
1,405,410.
Patented Feb. 7, 1922.
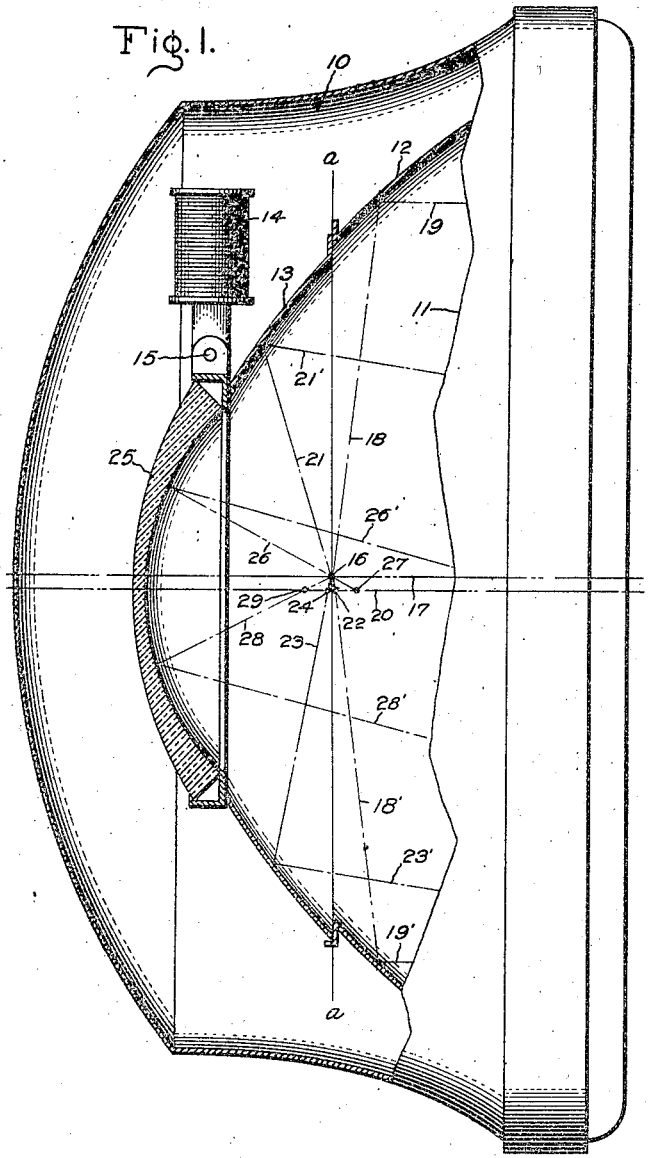
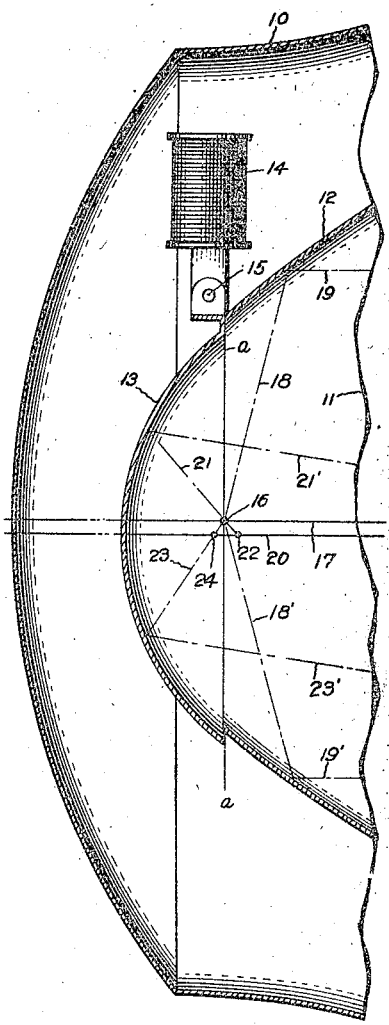
Inventor:
Cromwell A. B. Halvorson Jr.
by Albert G. Davis
his Attorney.

UNITED STATES PATENT OFFICE.

CROMWELL A. B. HALVORSON, JR., OF LYNN, MASSACHUSETTS.

HEADLIGHT REFLECTOR.

1,405,410.   Specification of Letters Patent.   Patented Feb. 7, 1922.

Application filed January 17, 1921. Serial No. 437,697.

*To all whom it may concern:*

Be it known that I, CROMWELL A. B. HALVORSON, Jr., a citizen of the United States, residing at Lynn, in the county of Essex, State of Massachusetts, have invented certain new and useful Improvements in Headlight Reflectors, of which the following is a specification.

My invention has reference to reflectors for automobile headlights, and the like, of the type generally known as "anti-glare" lighting units, and is designed to produce parallel rays of light for long distance illumination as, for instance, when used in automobile headlights on country roads, and to direct a portion of the reflected rays downwardly to make the light non-glaring for city use or when approaching parties moving in the opposite direction. I accomplish this result by providing two reflecting surfaces of revolution adapted to reflect rays parallel to their axes from a source of light in their respective foci, arranged with their axes parallel and their focal planes coincident. These surfaces are arranged to be relatively displaced but with their axes parallel at the will of the operator, and a source of light is located in the focus of the reflecting surface in front of the common focal plane. For long distance illumination, the reflecting surfaces are arranged with their foci coincident, in which position parallel rays only are reflected. For "anti-glare" illumination, the surface located in back of the focal plane is displaced downwardly, with its axis parallel to the axis of the front surface, in which position the rays of light striking the back surface are reflected downwardly. This structure is similar to that shown in my copending application for Letters Patent, Serial No. 437,698, filed January 17, 1921, which, however, due to the fixed relation of its elements, accomplishes a different result.

My invention will be better understood from the following description when taken in connection with the accompanying drawings and its scope will be pointed out in the appended claims.

In the accompanying drawings, Fig. 1 is a side elevation, partly in section, of a headlight provided with an adjustable reflector embodying my invention, shown in a non-glaring position, with lines indicating the direction of reflected rays of light, and Fig. 2 is a view similar to Fig. 1 illustrating another form which my reflector may assume.

Referring to Fig. 2 of the drawings, the numeral 10 indicates a lamp casing, which may be of any conventional type, in which is suitably mounted a reflector 11. The reflector 11 is formed of two reflecting surfaces 12, 13, of the same focal length, each adapted to direct beams parallel to its axis from a source of light placed at the focus. These surfaces may be sections from one paraboloid or from duplicate paraboloids having the same focal lengths.

The reflecting surfaces are cut substantially through their focal planes, that is, on a line perpendicular to their axes passing through their foci, as indicated by the line *a—a*. The surface 12 is formed from that portion of its parabola in front of the focal plane, and the surface 13 from the portion in back of the focal plane, and the two surfaces are arranged edge to edge with their focal planes substantially coincident. Obviously, by this arrangement the axes of the reflecting surfaces may either coincide or be parallel.

The back reflector 13 is arranged to slide up and down in a vertical plane, with its axis parallel. I preferably accomplish this movement with an electromagnet 14 which is suitably mounted within the casing 10, and secured outside of the surface 13 and with its armature connected with that surface at 15, in any suitable manner.

A suitable source of light is located in the focus of the front surface 12 at 16. The particular type of light or the manner in which it is mounted within the casing forms no part of my invention, although I preferably employ an incandescent lamp having a concentrated filament mounted in the side of the reflector. It is, of course, understood that a point source of light is not available; however, in order to illustrate the direction of reflected rays, it is convenient to regard the light source 16 as a point source.

The line 17 indicates the axis of the front surface 12. Any rays of light, say the rays 18, 18' proceeding from the source 16, which strike the front reflecting surface 12, are reflected parallel to its axis 17, in accordance with well known laws governing reflection from parabolic surfaces, as indicated by the reflected rays 19, 19'. If now the electromagnet 14 be energized, in which case it is arranged to move the back reflecting surface 13 upwardly, so that its axis 20 coincides with the axis 17 of the front reflecting surface, all reflected rays will be parallel to their now common axis, in a manner readily understood, since their foci now coincides and the light source 16 is located in their now common focus. By deenergizing the electromagnet, the back surface 13 is allowed to drop to a lower position, with its axis 20 parallel with but below the axis 17, as shown in the drawings. In this position, the reflected rays from the front surface 12 are not changed. With respect to those rays of light which strike the back surface 13, any ray directed upwardly, say the ray 21, apparently comes from a point 22 located on its axis 20 in front of the focal plane, and such rays are therefore directed convergently with the axis, i. e., downwardly, as indicated by the reflected ray 21'. Any ray striking the surface 13 downwardly, say the ray 23, passes through its axis 20, and apparently comes from a point 24 on said axis in back of the focal plane, and such rays are directed divergently from the axis, i. e., downwardly, as indicated by the reflected ray 23'.

In another form of my invention, the back reflecting surface 13 may be provided with a suitable opening arranged to receive a Mangin mirror 25, having the same focal length as the surface 13, and with its axis coincident with the axis 20 of said surface, as shown in Fig. 1. In this structure, the rays of light striking the surfaces 12, 13 are reflected in the same manner as above described with reference to Fig. 2. With respect to the rays of light striking the Mangin mirror 25, when the electromagnet 14 is energized, in which position the axis of the Mangin mirror coincides with the axis 17, such rays are reflected parallel to said axis, in accordance with well known laws governing reflection from mirrors of this character. When the electromagnet 14 is deenergized, in which position the axis of the Mangin mirror is below but parallel to the axis 17, any ray from the source 16 directed upwardly, say the ray 26, apparently comes from a point 27 located on its axis in front of the focal plane, and such rays are reflected downwardly, as indicated by the ray 26'. Any ray from the source directed downwardly toward the Mangin mirror, say the ray 28, passes through its axis, and apparently comes from a point 29 on said axis in back of the focal plane, and is also reflected downwardly, as indicated by the reflected ray 28'.

From the foregoing, it will be seen that by energizing the electromagnet 14, the foci of the front and back reflecting surfaces are caused to coincide, giving reflected rays parallel to their axes, a condition desired for long distance illumination. By deenergizing the electromagnet, the surfaces are relatively displaced with the axis of the back surface parallel with and below the axis of the front section. In this position, all rays reflected from the surface in back of the focal plane are directed downwardly, the condition desired for anti-glare illumination. With respect to the parallel rays reflected from the front surface, in the anti-glare position of the back part of the reflector, it is found in practice that these are not sufficient to cause inconvenience, since the greater portion of the reflected rays proceeds from in back of the focal plane. It is, of course, understood that the operation of the electromagnet could be reversed, so that when denergized, long distance illumination is obtained and when energized a "non-glare" condition exists.

While I have described my invention as embodied in concrete form in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A reflector comprising two reflecting surfaces of revolution arranged with their axes parallel, and with their focal planes coincident, and means for relatively displacing said reflecting surfaces with their axes parallel and their focal planes remaining coincident.

2. A reflector comprising two reflecting surfaces of revolution arranged with their axes parallel, and with their focal planes coincident, no portion of one of said reflecting surfaces being back of the focal plane and no portion of the other reflecting surface being ahead of the focal plane, and means for relatively displacing said reflecting surfaces with their axes parallel and their focal planes remaining coincident.

3. A reflector comprising two reflecting surfaces of revolution arranged with their axes parallel, and with their focal planes coincident, no portion of one of said reflecting surfaces being back of the focal planes and no portion of the other reflecting surface being ahead of the focal plane, and means for relatively displacing said reflecting surfaces with their axes parallel and their focal planes remaining coincident, in combination with a source of light in the focus of the surface in front of the focal plane.

4. A reflector comprising a parabolic reflecting surface cut into two parts on a plane perpendicular to its axis through the focus, a Mangin mirror fixed in and constituting an element of the part back of the focus, said parts being arranged with the axis of the Mangin mirror and the axis of the surface in front of the focus parallel, and means for relatively displacing said parts with said axes parallel and their focal planes remaining coincident.

5. A reflector comprising a parabolic reflecting surface cut into two parts on a line perpendicular to its axis through the focus, a Mangin mirror fixed in and constituting an element of the part back of the focus, said parts being arranged with the axis of the Mangin mirror and the axis of the surface in front of the focus parallel, and means for relatively displacing said parts with said axes parallel and their focal planes remaining coincident, in combination with a source of light in the focus of the surface in front of the focal plane.

In witness whereof, I have hereunto set my hand this 12th day of January, 1921.

CROMWELL A. B. HALVORSON, Jr.